US007773115B2

(12) United States Patent
Estevez et al.

(10) Patent No.: US 7,773,115 B2

(45) Date of Patent: Aug. 10, 2010

(54) METHOD AND SYSTEM FOR DEBLURRING DIGITAL CAMERA IMAGES USING REFERENCE IMAGE AND MOTION ESTIMATION

(75) Inventors: Leonardo Estevez, Rowlett, TX (US); Aziz Umit Batur, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 644 days.

(21) Appl. No.: 11/300,818

(22) Filed: Dec. 15, 2005

(65) Prior Publication Data

US 2006/0158523 A1 Jul. 20, 2006

Related U.S. Application Data

(60) Provisional application No. 60/637,197, filed on Dec. 15, 2004.

(51) Int. Cl.
*H04N 5/228* (2006.01)
*H04N 7/12* (2006.01)

(52) U.S. Cl. .............................. 348/208.13; 348/208.4; 348/208.99; 375/240.16

(58) Field of Classification Search .............. 348/208.4, 348/208.13, 208.5, 208.99; 375/240.16
See application file for complete search history.

(56) References Cited

U.S. PATENT DOCUMENTS

| | | | | |
|---|---|---|---|---|
| 4,517,599 | A * | 5/1985 | Zwirn et al. | 348/625 |
| 6,130,912 | A * | 10/2000 | Chang et al. | 375/240.16 |
| 6,285,804 | B1 * | 9/2001 | Crinon et al. | 382/299 |
| 6,590,934 | B1 * | 7/2003 | Kim | 375/240 |
| 7,327,787 | B1 * | 2/2008 | Chen et al. | 375/240.16 |
| 2001/0021224 | A1 * | 9/2001 | Larkin et al. | 375/240.16 |
| 2005/0259888 | A1 * | 11/2005 | Ozluturk | 382/260 |

* cited by examiner

*Primary Examiner*—Lin Ye
*Assistant Examiner*—Mekonnen Dagnew
(74) *Attorney, Agent, or Firm*—Wade J. Brady, III; Frederick J. Telecky, Jr.

(57) ABSTRACT

Deblur digital camera image captured in low-light, long-integration-time conditions by deconvolution based on motion estimation from preceding and following reference images. Alternatively, capture multiple short-integration-time images and fuse after motion estimation and alignment.

15 Claims, 5 Drawing Sheets

FIRST REFERENCE IMAGE
LOW-LIGHT, LONG-INTEGRATION (BLURRED IMAGE)
SECOND REFERENCE IMAGE
TIME
ESTIMATE LINEAR MOTION FROM REFERENCE IMAGES

SHORT-INTEGRATION REFERENCE IMAGE
SHORT-INTEGRATION REFERENCE IMAGE
SHORT-INTEGRATION REFERENCE IMAGE
SHORT-INTEGRATION REFERENCE IMAGE
SHORT-INTEGRATION REFERENCE IMAGE
LONG-INTEGRATION BLURRED IMAGE (DEBLURRING TARGET)
TIME
ESTIMATE NON-LINEAR MOTION

METHOD AND SYSTEM FOR DEBLURRING DIGITAL CAMERA IMAGES USING REFERENCE IMAGE AND MOTION ESTIMATION

CROSS-REFERENCE TO RELATED APPLICATIONS

This application claims priority from provisional application No. 60/637,197, filed Dec. 15, 2004.

BACKGROUND OF THE INVENTION

The present invention relates to digital video signal processing, and more particularly to architectures and methods for digital camera front-ends.

Imaging and video capabilities have become the trend in consumer electronics. Digital cameras, digital camcorders, and video cellular phones are common, and many other new gadgets are evolving in the market. Advances in large resolution CCD/CMOS sensors coupled with the availability of low-power digital signal processors (DSPs) has led to the development of digital cameras with both high resolution image and short audio/visual clip capabilities. The high resolution (e.g., a 5 megapixel sensor with a 2560×1920 pixel array) provides quality offered by traditional film cameras.

FIG. 2*a* is a typical functional block diagram for digital camera control and image processing (the "image pipeline"). The automatic focus, automatic exposure, and automatic white balancing are referred to as the 3A functions; and the image processing includes functions such as color filter array (CFA) interpolation, gamma correction, white balancing, color space conversion, and JPEG/MPEG compression/decompression (JPEG for single images and MPEG for video clips). Note that the typical color CCD consists of a rectangular array of photosites (pixels) with each photosite covered by a filter (the CFA): typically, red, green, or blue. In the commonly-used Bayer pattern CFA one-half of the photosites are green, one-quarter are red, and one-quarter are blue.

Typical digital cameras provide a capture mode with full resolution image or audio/visual clip processing plus compression and storage, a preview mode with lower resolution processing for immediate display, and a playback mode for displaying stored images or audio/visual clips.

When a digital image is captured indoors and the subject is at a distance from the camera, any use of zoom without a tri-pod will cause the image to be blurred due to operator jitter during the increased integration time for sensor acquisition to accommodate the low-light conditions. In general, low-light conditions require long exposure times (time for charge integration in a CCD or CMOS sensor) to yield an acceptable signal-to-noise ratio; and with electronic zoom, only a portion of the sensor is used, so the integration time is further multiplied.

SUMMARY OF THE INVENTION

The present invention provides digital camera image deblurring by the use of reference images with motion estimation.

DESCRIPTION OF THE PREFERRED EMBODIMENTS

1. Overview

Preferred embodiment methods deblur captured images with one or more of the features of (1) using two or more short-integration images to estimate motion and then deconvolving a long-integration image with this estimated motion, (2) fusing multiple (e.g., 5-10) short-integration images which have been registered (aligned with motion translation), and (3) subsampling reference images for motion model selection.

Figure 2A:
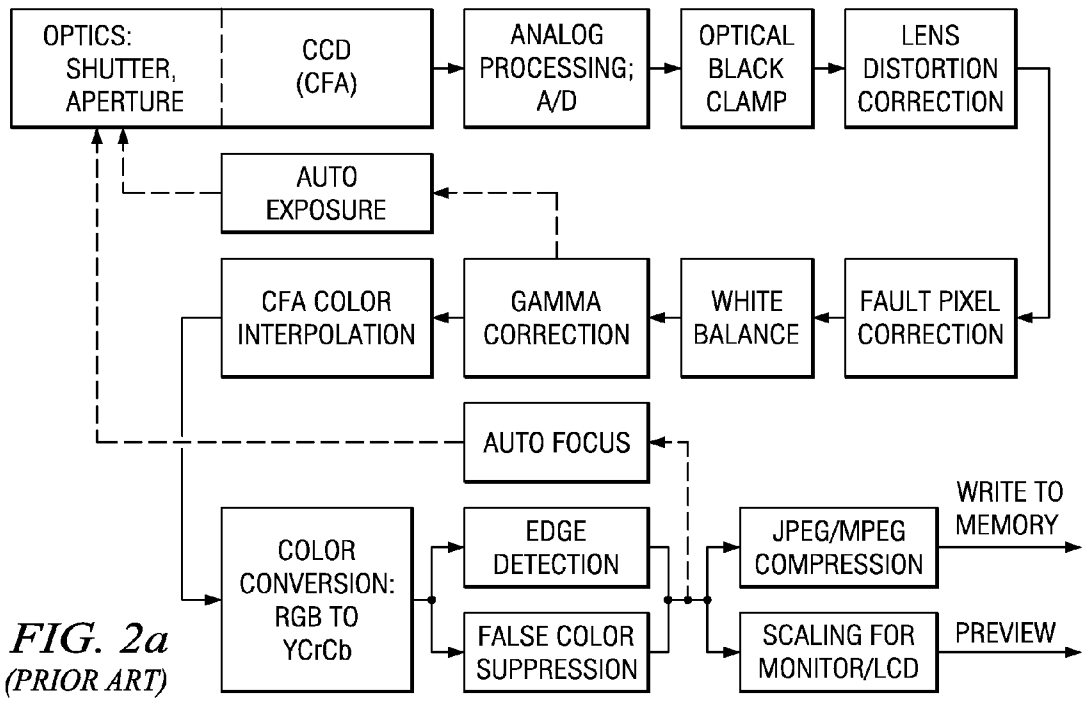
FIGS. 2*a*-2*c* show digital camera and network transmission.
Figure 2C:
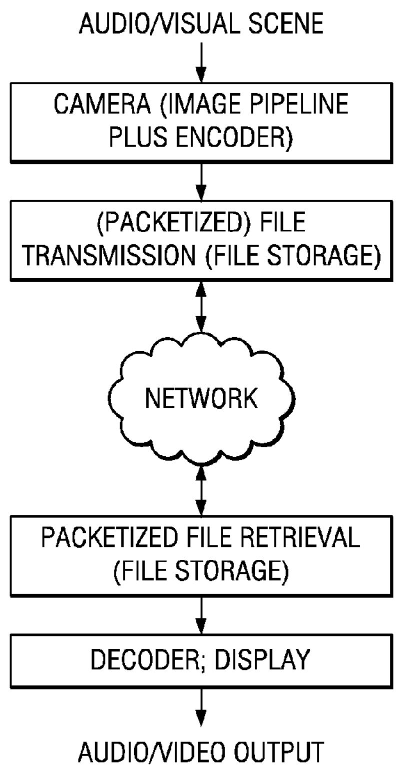
Figure 2B:
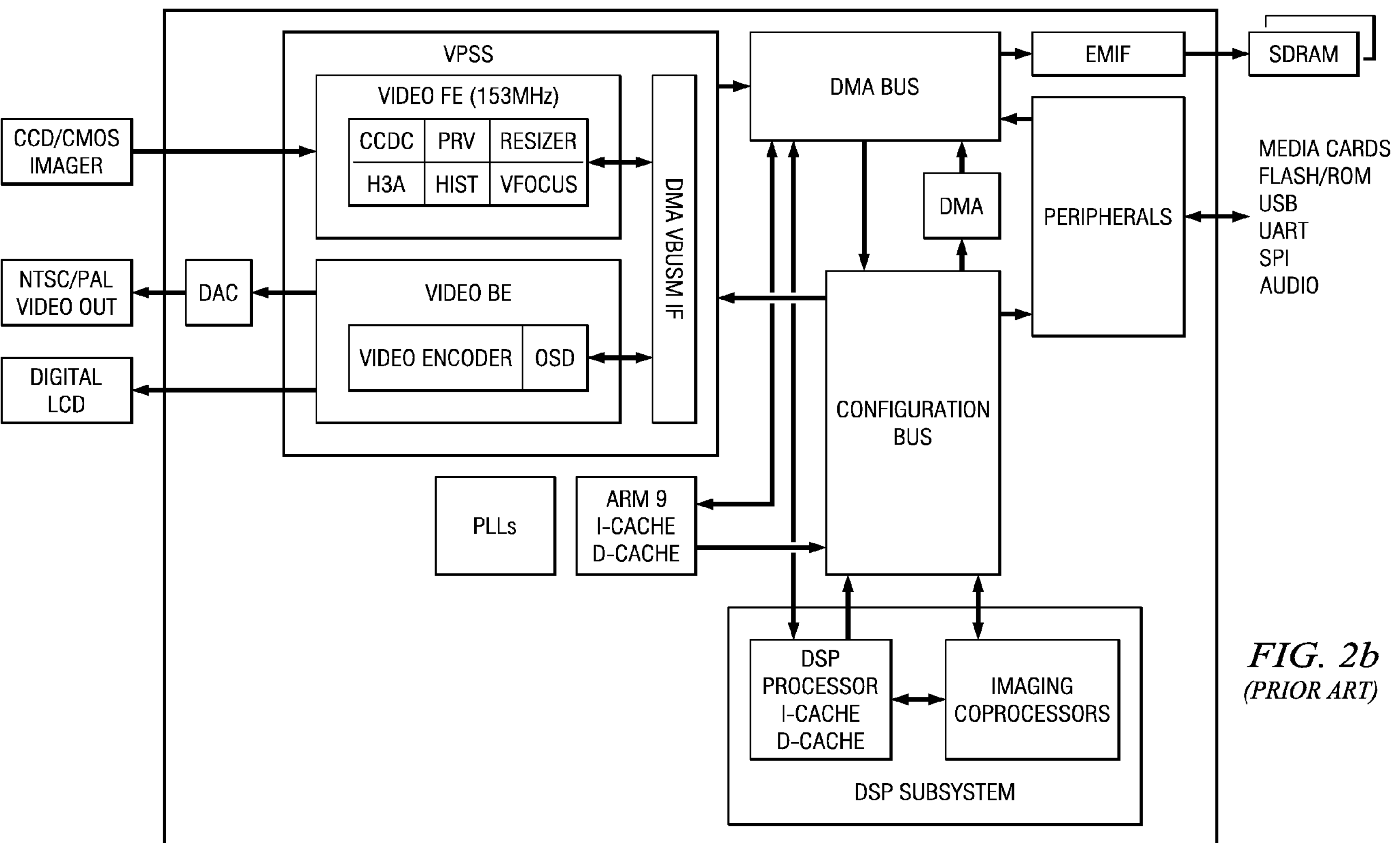

Preferred embodiment systems (e.g., digital cameras, video cell phones, camcorders, et cetera) perform preferred embodiment methods with any of several types of hardware which may include digital signal processors (DSPs), general purpose programmable processors, application specific circuits, or systems on a chip (SoC) such as combinations of a DSP and a RISC processor together with various specialized programmable accelerators. FIG. 2*b* is an example of digital camera hardware which includes a front end (Video FE) for image capture, an external memory interface (EMIF), a RISC processor (ARM9), and a DSP plus Imaging Coprocessors. A stored program in an onboard or external (flash EEP)ROM or FRAM could implement the image deblurring methods. Analog-to-digital converters and digital-to-analog converters can provide coupling to the real world, modulators and demodulators (plus antennas for air interfaces) can provide coupling for transmission waveforms, and packetizers can provide formats for transmission over networks such as the Internet; see FIG. 2*c*.

2. Deconvolution with Linear Motion Estimation

The first preferred embodiment methods for digital cameras in low-light conditions capture (and store without compression) multiple frames (images) with short integration (exposure) times, which are called reference images in the following descriptions. These reference images do not have a significant amount of motion blur due their short integration times (e.g., 5 to 10 milliseconds), but due to low-light conditions, they are also noisy, which makes them undesirable from a consumer perspective. (Note that pixel values can be scaled to achieve a target image brightness independent of integration time; thus noise is the quality limiting factor.) Since these reference images are blur-free, the preferred embodiment methods use reference images to estimate the camera motion by matching various blocks of the scene. The method also captures an additional long-integration (e.g., 30 to 100 ms) image in between two of these reference images; see FIG. 1*a*. This additional long-integration image has less noise than the short-integration reference images, but is blurred due to the long integration time, typically 5-10 times as long as the reference images. The motion information computed from the reference images can be used to deblur this image using deconvolution. The estimated motion between reference images would provide an estimate for the blurring function in the blurred image, which can be used to invert the blur process. Many of the available algorithms proposed in the image restoration literature can be used to achieve this de-blurring operation.

In more detail, a first preferred embodiment method includes the following steps.

Figure 1A:
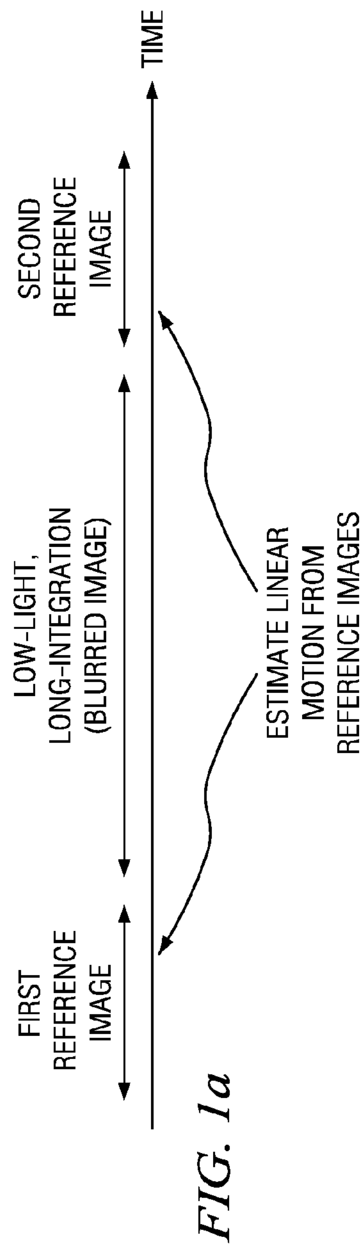
FIGS. 1*a*-1*f* illustrate preferred embodiment image capture sequences.

(a) Successively capture (without pausing) and store raw data for a first short-integration reference image (5-10 ms), a long-integration low-noise image (30-100 ms), and a second short-integration reference image (5-10 ms). FIG. 1*a* illustrates the sequence.

(b) Use the first and second reference images to estimate a global motion vector for the 110 ms time difference between them. This can be a full search over a limited range to find the smallest sum of absolute differences (SAD) and may include interpolation to have sub-pixel resolution. In particular, a motion vector V=[Vx, Vy] is found as:

$$V=\arg\min_{Vx,\,Vy}\Sigma_{m,n}|p_2(m,n)-p_1(m+Vx,n+Vy)|$$

where $p_1(m, n)$ and $p_2(m, n)$ are the pixel (luminance) values for the first and second reference images, respectively. The space of possible Vs which is searched to find the minimum can typically be restricted to a neighborhood of 0 because the motion to be detected is camera user jitter and a still image scene likely has few fast-moving objects. (The motion estimation method described in section 4 could be used here as well.)

(c) Use the estimated motion vector V to deconvolve the low-noise image according to a selected motion model and deconvolution method. As an example, a simple linear motion model presumes the blurred pixel at (m,n), denoted $p_B(m,n)$, is given by a simple averaging along the motion path such as:

$$p_B(m,n)=\int_{0<t<1}p(m-tVx,n-tVy)dt$$

where the motion vector has been scaled to the time interval of the long-integration capture. Of course, this is just a two-dimensional convolution of the unblurred image p(m, n) with the blurred image of a single point source $h(m,n)=\int_{0<t<1}\delta(m-tVx)\delta(n-tVy)dt$ which would be interpreted in terms of interpolations for the non-integer pixel locations and Kronecker deltas for the Dirac deltas. Then transforming (2-D DFT) to the frequency domain formally gives a deconvolution:

$$P(j,k)=P_B(j,k)/H(j,k)$$

where P(j,k) is the transform of p(m,n), $P_B(j,k)$ is the transform of $p_B(m,n)$, and H(j,k) is the transform of h(m,n). However, this raises division by 0 problems, so a regularization term α would typically be included, such as in a constrained least squares approach:

$$P(j,k)=P_B(j,k)\,H(j,k)^*/(|H(j,k)|^2+\alpha)$$

A final inverse transform (2-D IDFT) recovers the deblurred image.

3. Deconvolution with Relative and/or Nonlinear Motion

Figure 1B:
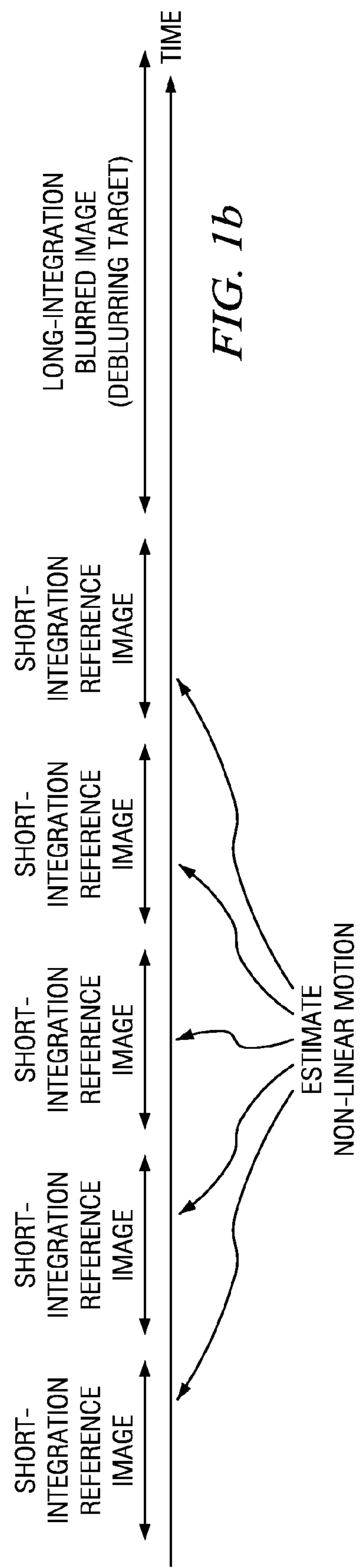
Figure 1C:
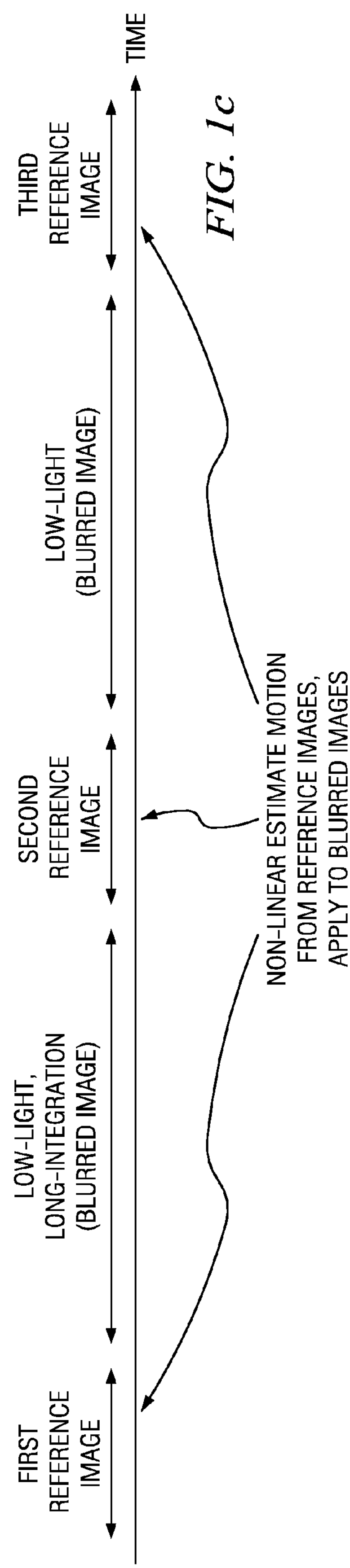

FIG. 1*a* shows the needed global linear motion information extracted by capturing a short-integration image before and after the long-integration image for the linear model; whereas, additional short-integration images may be captured at equally spaced points in time for relative and/or nonlinear modeling. FIG. 1*b* shows five initial short-integration (e.g., 10 ms) images for model determination and then the long-integration (e.g., 100 ms) image to be processed according to the model. Of course, the long-integration image may be captured between any two of the five short-integration reference images as illustrated in FIG. 1*c*. Non-linear models could include oscillatory jitter, linear motion out of the plane of the image, different motions for various objects in the scene, and so forth.

For example, a first nonlinear motion model presumes a simple periodic jitter motion due to a camera user's attempts to maintain a steady view. This model could be expressed in terms of the blurred point source as $$h(m,n)=\int_{0<t<1}\delta(m-\sin(ft)Dx)\delta(n-\sin(ft)Dy)dt$$

where the scaled jitter frequency f plus the maximum displacement vector components Dx, Dy would be estimated from the five reference images by minimizing the SADs. Of course, the time increments between reference images must be less than the jitter frequency to avoid aliasing.

Another example has one or more objects in the scene with relative motion compared to the background which has a motion due to the camera user (either linear as in section 2 or nonlinear as in the preceding example). In this example use the usual block-based motion compensation of video encoding standards such as MPEGx and H.26x to find an average (over the five reference images) motion vector for each macroblock of the images, and aggregate the macroblocks with similar motion vectors into regions. Then for each region use the average motion vector to estimate the corresponding blur point source function, $h_{region}(m,n)$, and separately de-convolve each such region. In this case the 2-D DFT would be performed after 0 padding the areas outside of the region being deconvolved. The background would presumably constitute one of the regions.

4. Fusion of Short-Integration Images

The second preferred embodiment methods also capture multiple frames with short integration times (reference images). Again, these reference images do not have a significant amount of motion blur due their short integration times, but they are also noisy due to the low-light, short-integration time. The second preferred embodiment methods directly fuse these reference images into a single image after compensating for the motion between the reference images with subpixel accuracy. This fusion operation would take place in an interpolated grid that has higher resolution than the original image so that subpixel motion information can be utilized. The fusion operation can be a simple summation of the multiple reference images followed by a scale correction, if the noise model is assumed to be additive, white, Gaussian. For more complicated noise models, the fusion method can be locally adapted according to the local characteristics of the noise.

Figure 1D:
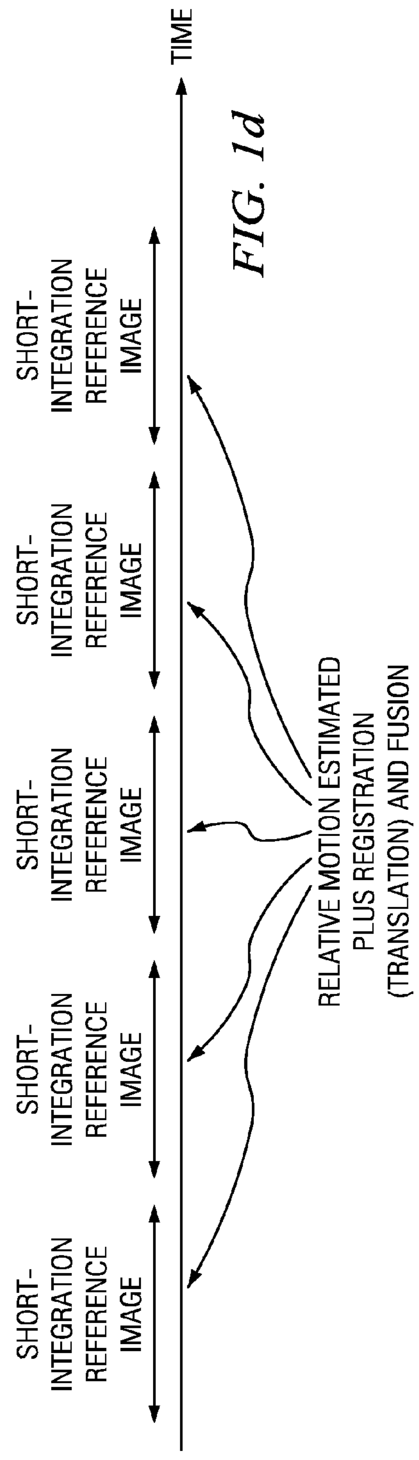

In more detail, let T be the normal exposure time to capture the image. If the environment is very =–low-light, then T can be very long (e.g., T=150 ms) and this increases the possibility of blur. First, capture N low-exposure (short-integration) images, each with an exposure time of T/N (e.g., N=10); see FIG. 1*d*. Note that if we reduce the exposure time without making any other adjustments, this will make the images darker. Therefore, increase the digital or analog gain of the digital capture device by a factor of N so that we preserve the brightness level of the image. Increasing the digital or analog gain will increase the noise in the image.

Second, register (align) the N low-exposure images by using vertical and horizontal translations. Use the following technique to find the required amount of translation: assume that the N images each has K rows and L columns (e.g., K=1920 and L=2560), and compute the following two vectors for the i-th image where $I_i(m,n)$ denotes the intensity at pixel (m,n):

$$h_i(n)=\Sigma_{0\leqq l<L}I_i(l,n)\text{ for }0\leqq n<K$$

$$v_i(n)=\Sigma_{0\leqq k<K}I_i(n,k)\text{ for }0\leqq n<L$$

These vectors are horizontal and vertical intensity sums across the images. Compute the sum-of-absolute-differences (SADs) between the vectors of different images to find the horizontal and vertical components of a motion vector between them. Use subpixel motion estimation by interpolating these vectors if necessary. In particular, initially compute integer motion vector components (Vx, Vy) relative to the first (0-th) low-exposure image:

$$Vy(i)=\text{argmin}_{Vy}\Sigma_{0\leq n<K}|h_i(n)-h_0(n+Vy)|$$

$$Vx(i)=\text{argmin}_{Vx}\Sigma_{0\leq n<L}|v_i(n)-v_0(n+Vx)|$$

where needed vector components can be defined outside of the ranges 0≦n<K and 0≦n<L by constant extension. If a minimum SAD is not less than a threshold, then refine to a half-pixel resolution motion vector component, such as by linear interpolation. For example, half-pixel resolution for the Vy component of the i-th image would be:

$$Vy(i)=\text{argmin}_{Vy}\Sigma_{0\leq n<K}|h_i(n)-[h_0(n+\lfloor Vy\rfloor)+h_0(n+\lceil Vy\rceil)]/2|$$

where ⌊Vy⌋ denotes the largest integer not greater than Vy and ⌈Vy⌉ denotes the smallest integer not less than Vy, and Vy is a multiple of ½. Similarly, refinement to quarter-pixel resolution motion vector components could just use a weighted version of the half-pixel interpolations for quarter pixels.

Third, translate the images in the reverse direction of the motion vector to register (align) the images. Then average the corresponding pixels in the registered images to create a fused image. This image will have reduced noise because the independent noise from different images will average out. In particular, for the intensity:

$$I(m,n)=(1/N)\Sigma_{0\leq i<N}I_i(m-Vx(i),\ n-Vy(i))$$

where Vx(0)=0 and Vy(0)=0. Analogously, apply the same (intensity-defined) translations to fuse color images.

Figure 1E:
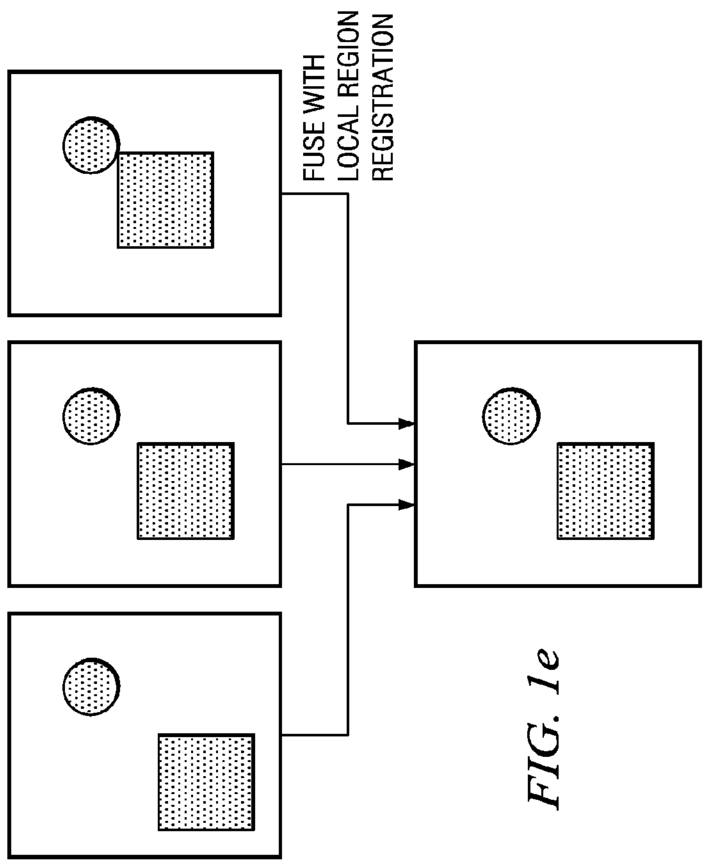

Further, the registration can be on a local basis in that objects with differing motion vectors can be separately fused; see FIG. 1*e*. This localized registration requires local motion vector determination, such as is done in video standards like MPEGx and H.26x. N typically lies in the range of 5-20, although as few as 2 images could be fused.

5. Integration Time Prediction

Figure 1F:
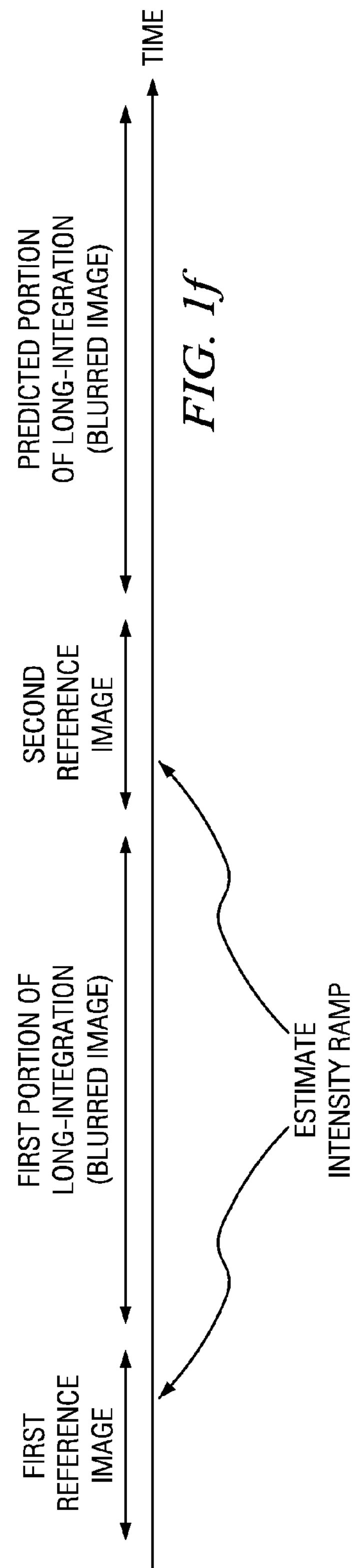

In further preferred embodiment methods, two or more short-integration images are captured to model the rate at which individual pixel values are incrementing over time, and the remaining integration time is predicted based on the model. FIG. 1*f* illustrates this with an initial short-integration image, followed by a first portion of the long-integration image, then the second short-integration image, and lastly, the predicted remainder of the long-integration image. This requires some filtering or averaging between the captured short integration images to reject sensor noise versus what would be actual image data. And the long-integration image would be deblurred as in the first preferred embodiment methods. The same integration time prediction could be used with the second preferred embodiment fusion methods by analyzing two of the short-integration images and then predicting a value for N, the number of short-integration images to be fused.

6. Flash

In a variation usable with either the first or second preferred embodiment methods, one of the short-integration images is captured in the presence of assisted luminance (flash) while the other(s) is not—the more illuminated image may be weighted in predictive analysis to help eliminate noise and may have a shortened integration time (e.g., 2 ms) with respect to the other short-integration (e.g., 10 ms) image(s).

7. Subsampling

In further preferred embodiments, the reference images may be subsampled or lower resolution images—the set of subsampled images are used to generate the prediction model (e.g., linear or one from a set of nonlinear) and to select noise filtering while the full resolution image(s) is used for extrapolated fusion. For example, in the method of FIG. 1*b* the five short-integration images could be subsampled and analyzed to select a motion model, and then the long-integration image would be captured at full resolution and processed according to the selected model. The subsampling allows for lower complexity analysis of the reference images.

8. Modifications

The preferred embodiments maybe modified in various ways while retaining one or more of the features of short-integration reference images for motion estimation and subsequent deblurring a long-integration image and fusion of short-integration images with motion registration.

For example, the preferred embodiments may be applied for motion compensation in MRI due to long imaging times where the motion modeling may include the periodic motion due to breathing, heart beating, etc. The multiple short-integration images may have varying exposure times (e.g., between 2 and 20 ms) and when used for motion estimation may be scattered among portions of a long-integration exposure.

What is claimed is:

1. A method of digital camera operation, comprising:

(a) capturing a plurality of images, $I_1, I_2, \ldots, I_N$, of a scene where N is an integer greater than 1 and image $I_n$ has an integration time of $T_n$ for n=1, 2, . . . , N, wherein each integration time $T_n$ is short enough that image $I_n$ is blur-free and noise is a single quality limiting factor;

(b) capturing an image $I_{long}$ of said scene with an integration time $T_{long}$ where $T_{long}$ is greater than or equal to $5T_n$ for n=1, 2, . . . , N, wherein said image $I_{long}$ is blurred due to said integration time $T_{long}$;

(c) using said plurality of images to estimate motion occurring during said capturing of $I_{long}$; and (d) using said estimated motion to deblur $I_{long}$.

2. The method of claim 1, wherein N=2.

3. The method of claim 1, wherein $T_n$ is in a range of 5-10 milliseconds for n=1, 2, . . . , N, and $T_{long}$ is in a range of 30-100 milliseconds.

4. The method of claim 1, wherein said using said plurality of images to estimate motion presumes constant motion and said deblurring is deconvolution.

5. The method of claim 1, wherein N is greater than 2 and $I_{long}$ is captured in at least two portions of $T_{long}$ separated in time.

6. The method of claim 1, wherein regions of said plurality of images have separate motion estimation and corresponding regions of said $I_{long}$ have separate deblurrings.

7. The method of claim 1, wherein said images $I_n$ have a lower resolution than said image $I_{long}$.

8. A digital camera, comprising:

(a) a front end for capturing images;

(b) a memory coupled to said front end for storing images; and (c) a processor coupled to said memory for processing said images, said processor operable to estimate motion from a plurality of reference images of a scene and to deblur an image of said scene using said motion estimates, wherein an integration time for each reference image is short enough that the reference image is blur-free.

9. The digital camera of claim 8, wherein said processor deblurs an image by fusion of translates of said reference images to form said deblurred image.

10. The digital camera of claim 8, wherein said processor is further operable:

to capture said image of said scene, wherein an integration time of said image is at least five times greater than said integration times of said reference images, wherein said image is blurred due to said integration time of said image, and to deblur said image of said scene using deconvolution.

11. The digital camera of claim 8, wherein said plurality of reference images consists of two reference images.

12. The digital camera of claim 10, wherein said integration time of each reference image is in a range of 5-10 milliseconds and said integration time of said image of said scene is in a range of 30-100 milliseconds.

13. The digital camera of claim 10, wherein estimating motion presumes constant motion.

14. The digital camera of claim 10, wherein said plurality of reference images comprises more than two reference images and said processor is further operable to capture said image of said scene in at least two portions of said integration time of said image separated in time.

15. The digital camera of claim 10, wherein said processor is further operable to estimate motion by separate motion estimation of regions of said plurality of reference images and to deblur corresponding regions of said image of said scene by separate deblurrings.

* * * * *